A. L. HERMAN.
REVERSING GEARING.
APPLICATION FILED OCT. 26, 1910.
1,018,972.
Patented Feb. 27, 1912.
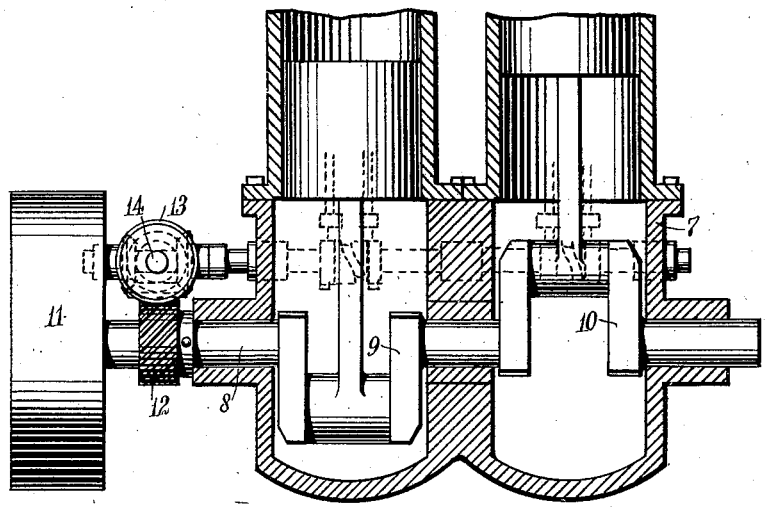
Fig.1
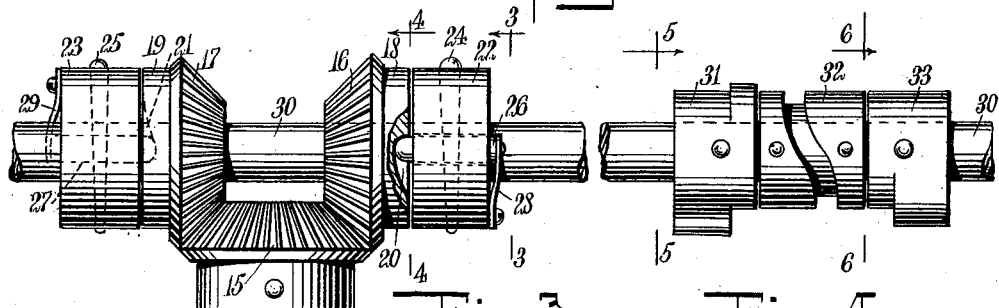
Fig.3     Fig.4
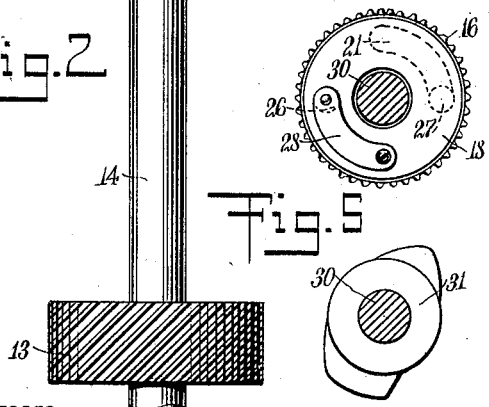
Fig.2
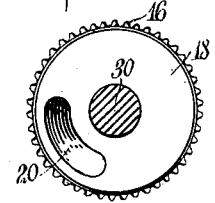
Fig.5     Fig.6
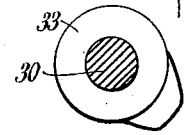
WITNESSES:
Johna Bergstrom
Walton Harrison
INVENTOR
Albert L. Herman
BY Munn & Co.
ATTORNEYS

UNITED STATES PATENT OFFICE.

ALBERT L. HERMAN, OF PROSPER, OREGON.

REVERSING-GEARING.

1,018,972.

Specification of Letters Patent. Patented Feb. 27, 1912.

Application filed October 26, 1910. Serial No. 589,152.

*To all whom it may concern:*

Be it known that I, ALBERT L. HERMAN, a citizen of the United States, and a resident of Prosper, in the county of Coos and State of Oregon, have invented a new and Improved Reversing-Gearing, of which the following is a full, clear, and exact description.

My invention relates to reversing gearing for general use, and more particularly to reversing gears suitable for use with internal combustion engines.

More particularly stated, my invention comprehends a revoluble shaft and a countershaft to be driven by the same in either direction, according to the direction of rotation of the first-mentioned revoluble shaft, the countershaft, however, remaining idle for a moment whenever the first-mentioned shaft is reversed in its direction of rotation and only taking up the rotation after the first-mentioned revoluble shaft has turned half a revolution. That is to say, I connect the two shafts together by a sluggish gearing so arranged that under normal conditions one of the shafts can drive the other bodily, yet when the driving shaft is stopped in its rotation and reversed in its direction, its new or reversed motion is not communicated to the other shaft until half a revolution of the driving shaft is made.

Reference is to be had to the accompanying drawings forming a part of this specification, in which similar characters of reference indicate corresponding parts in all the figures.

Figure 1 is a central section showing an internal combustion engine equipped with my improved reversing gear; Fig. 2 is a detail showing in plan the reversing gear; Fig. 3 is a section on the line 3—3 of Fig. 2, looking in the direction of the arrow, and showing one of the clutch members forming a part of the reversing gearing; Fig. 4 is a section on the line 4—4 of Fig. 2, looking in the direction of the arrow, and showing another one of the clutch members; Fig. 5 is a section on the line 5—5 of Fig. 2, looking in the direction of the arrow and showing one of the cams for operating the valve gear of the engine; and Fig. 6 is a section on the line 6—6 of Fig. 2, looking in the direction of the arrow, and showing another cam for operating the valve gearing of the engine.

At 7 is an internal combustion engine, which happens in this instance to be of the four-cycle type. The main shaft of the engine is shown at 8 and is provided with cranks 9, 10, these parts being of the usual or any desired construction.

At 11 is a fly wheel mounted rigidly upon the main shaft. A worm gear 12 is also mounted rigidly upon the main shaft and meshes with another worm gear 13, the latter being mounted rigidly upon a shaft 14 and extending across the general direction of the axis of the shaft 8. The shaft 14, because of its immediate control over various other parts hereinafter mentioned, I designate for convenience as a "driving shaft". Mounted rigidly upon the shaft 14 is a bevel gear 15 which meshes with two other bevel gears 16, 17. These two bevel gears are provided respectively with body portions 18, 19 integral with them, these body portions in turn being provided with pawl pockets 20, 21.

At 22, 23 are clutch members, each having a general annular form, and associated with these two clutch members are cotter pins 25 for holding them in position. Each clutch member 22 has a pawl 26 extending through it.

At 28, 29 are leaf springs mounted respectively upon the clutch members 22, 23 and engaging the pawls 26, 27. The tendency of each leaf spring 28, 29 is to force the adjacent pawl 26 or 27 into the corresponding pocket 21 or 20, provided the said pocket is brought into alinement with the pawl.

At 30 is a revoluble shaft upon which are fixedly mounted a number of cams 31, 32, 33. This shaft, because of its office, I designate as the "cam shaft". The bevel gears 16, 17 are loose relatively to this shaft and because of their meshing with the bevel gear 15, they always turn in opposite directions, and for this purpose are driven positively by aid of the shaft 14. The pawls 27 are located upon opposite sides of the cam shaft 30 and are so arranged that they operate one at a time, the particular pawl in action at any particular time depending upon the direction of rotation of the shaft 14. That is to say, when this shaft is turned in one direction the clutch member 18 is, by aid of the pawl 26, locked relatively to the clutch 22 so that the cam shaft 30 is turned in one direction; whereas, if the cam shaft 14 be reversed and turned in a direction opposite to that first contemplated, it turns idly for half a revolution and at the end of this half revolution the pawl 27 locks the clutch members 19, 23 rigidly together so that the cam shaft 30 is now turned in a direction contrary to that in which it traveled at first. The operation of my device is as follows: It is a well known fact that in an engine, if the cam shaft, or other shaft controlling the valve gearing, be turned half a revolution, other parts of the engine remaining stationary, the direction of rotation of the engine is thereby reversed. Conversely, it is true that if, by any means, the cam shaft be caused to remain stationary while the main shaft of the engine makes half a revolution and the cam shaft is then started up and driven positively by the engine, the direction of rotation of the engine is reversed. What I seek through my invention to do, therefore, is to normally drive the cam shaft 30 so long as the rotation of the engine is in a particular direction; yet to maintain the shaft 30 stationary for a period representing half a revolution of the main shaft of the engine whenever the direction of rotation of said main shaft is reversed, the reversal of the cam mechanism controllable by the cam shaft being thus effected in like manner as the cam mechanism might be affected by the shifting of a link motion.

Referring now to the drawing, and particularly to Fig. 2, it will be noted that so long as the shaft 14 turns in one direction—say to the right, according to Fig. 2—the clutch member 18 is locked rigidly to the clutch member 22 by aid of the pawls 26, the end of this pawl being, of course, in the deepest part of the pocket 20 and the cam shaft 30 being thus driven positively by the shaft 14, and consequently having a positive relation to the rotation of the main shaft of the engine.

Suppose, now, that the operator, either by manipulating the timer or in any other appropriate manner, causes such an explosion to take place in the engine as will reverse the direction of rotation of the main shaft 8. Ordinarily, in an engine such an explosion as this would not have any tendency to reverse the engine, for the reason that any rotary movement of the main shaft would merely cause a corresponding movement of the valve gearing so that the engine would remain undisturbed as regards its direction of rotation. With my device, however, the situation is different. When the main shaft 8, after having been turned in one direction, is reversed and turned in the opposite direction, it of course causes the shaft 14 to reverse and turn in a direction opposite to that in which it has been traveling. The bevel gears 16, 17 being driven positively by the bevel gear 15 with which they mesh, are also thereby reversed in their direction of travel. This being true, it follows that the pawl 26 is pushed to the right according to Fig. 1, this movement being accomplished by the inclined bottom of the pocket 20 moving obliquely against the rounded point of the pawl, the leaf spring 18 yielding slightly. This leaves the pawl 26 pressing against the clutch member 18 but not extending into the pocket 20. Hence, the bevel gear 16 is no longer rigid relatively to the shaft 30 and is for the moment free to turn relatively to the same. The rotation of the bevel gear 17, in a direction opposite to that in which it has been turning, soon carries the clutch member 19 into such position that the pawl 27 enters the pocket 21 and lodges against the steep wall thereof, thus forming a positive lock as between the clutch members 19, 23. When this occurs, the bevel gear 17 begins to rotate positively, being driven directly by the clutch member 23 which, like the clutch member 22, always turns positively with the shaft 30 and in the same direction in which the shaft happens at a particular moment to be turning. The shaft 30 is thus driven positively from the shaft 14, but with these qualifications, that after these two shafts have been thus turned in one direction and the shaft 14 is stopped and reversed, the shaft 30 does not immediately begin to turn in the opposite direction, but waits for a period representing one-half a revolution. The net result, therefore, is that as between the driving shaft 14 and the cam shaft 30 the gearing as a whole is in a sense sluggish. the extent of the sluggishness being equal to a lost motion equal to precisely one-half a revolution of the cam shaft 30. That is to say, if the shaft 14 has been turning the shaft 30 in a particular direction and is reversed, the shaft 30 is picked up, by the sluggish gearing, after the reverse rotation has continued for a period representing half a revolution of the shaft 30, this being in this instance equal to half a revolution of the driving shaft 14.

I do not limit myself to the precise arrangement of the parts shown. Neither do I limit myself to any particular materials out of which the various parts may be made, the scope of my invention being commensurate with my claims.

Having thus described my invention, I claim as new and desire to secure by Letters Patent:

1. In a reversing gearing, the combination of a driving shaft, a gear member mounted rigidly thereupon, a driven shaft, a pair of gear members mounted loosely upon said driven shaft and each provided with a surface to be engaged by a pawl, said last mentioned gear members being operatively engaged by said first mentioned gear member, a pair of pawls supported by said driven shaft and disposed upon opposite sides thereof, said pawls being so positioned relatively to said surfaces to be engaged by them that at a particular moment one pawl only can engage a corresponding surface.

2. In a reversing gear, the combination of a driving shaft, a bevel gear carried thereby and rigid relatively thereto, a driven shaft, a pair of bevel gears mounted loosely upon the latter and free to turn in opposite directions, said last-mentioned bevel gears meshing with said first-mentioned bevel gear, clutch members carried by said bevel gears upon said driven shaft and provided with pawl pockets, other clutch members mounted rigidly upon said driven shaft and provided with pawls for fitting into said pockets, said pawls and said pawl pockets being so positioned relatively to each other that at a particular moment only one pawl can enter a corresponding pawl pocket, the other pawl being idle.

In testimony whereof I have signed my name to this specification in the presence of two subscribing witnesses.

ALBERT L. HERMAN.

Witnesses:
FRED J. BLUNDELL,
THOMAS W. PANTER.

Copies of this patent may be obtained for five cents each, by addressing the "Commissioner of Patents, Washington, D. C."